Nov. 12, 1968    J. R. NEW    3,409,987
RANGE FINDER
Filed Aug. 17, 1966
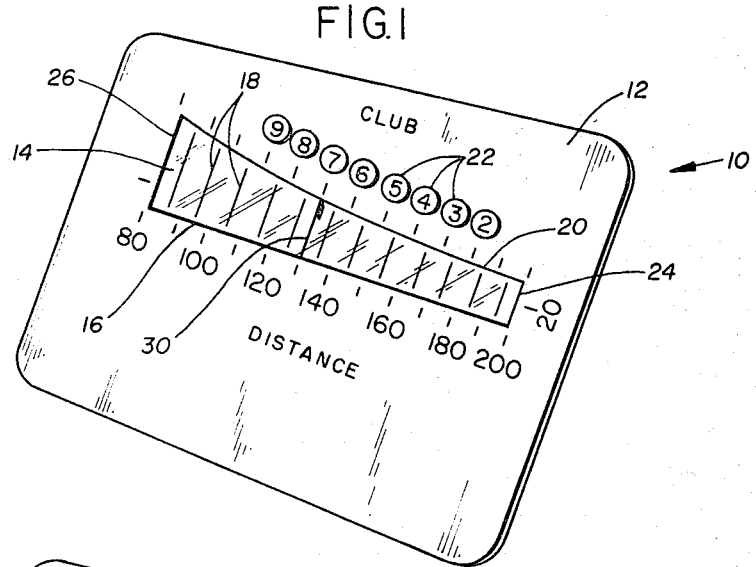
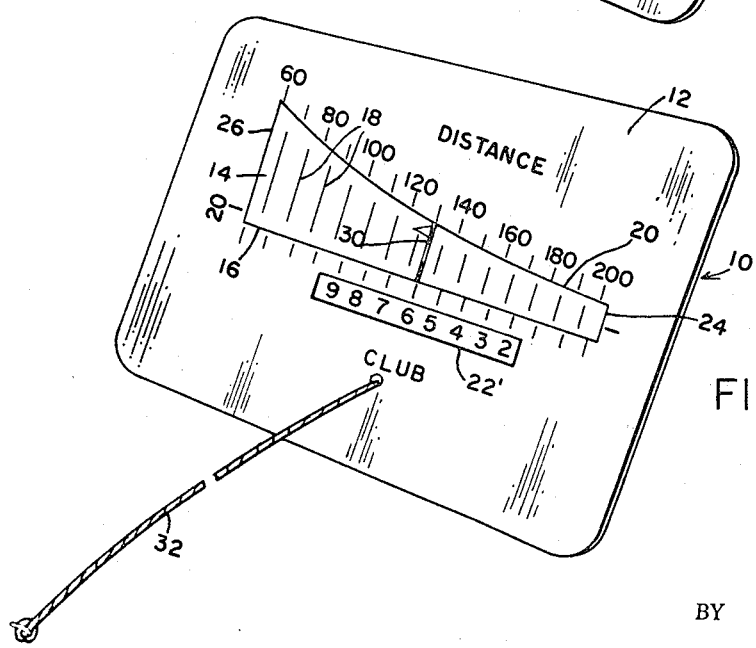
INVENTOR.
JAMES R. NEW
BY *Head & Johnson*
ATTORNEYS United States Patent Office 3,409,987
Patented Nov. 12, 1968

3,409,987
RANGE FINDER
James R. New, 3248 S. Victor, Tulsa, Okla. 74105
Filed Aug. 17, 1966, Ser. No. 573,003
6 Claims. (Cl. 33—64)

ABSTRACT OF THE DISCLOSURE

A golf distance measuring device includes a transparent opening having linear graduation imprinted upon an opaque surface surrounding a transparent viewing opening. Removable adhesive-back plastic strip contains golf club numbers uniformly spaced to conform with the interval of the distance scale. These numbers are removable and locatable on the distance scale relative to a golfer's ability.

---

This invention relates to a device for golfers to assist in selecting the proper golf club relative to the distance between the then position of the ball and the flag stick on the putting green.

Particularly, this invention has as its object to provide a device having thereon a linear scale with compartments for visually aligning the flag stick on a given golf course green and indicating therefrom the proper golf club to be used.

Another object of this invention is to provide a device which includes a linear distance scale means for visually indicating distance and/or golf club desired.

A yet further object of this invention is to provide a device which includes a visual calibrating scale in those instances the flag stick is longer or shorter than the standard.

These and other objects of this invention will become more apparent upon further reading of the specification and claims when taken in conjunction with the illustration, FIGURE 1 of which is a perspective view of the golf club distance indicator of this invention. FIGURE 2 is a perspective view of an alternate embodiment of this invention. The distance measuring and club selecting device is generally indicated by the numeral 10 and is formed of a synthetic resin material such as manufactured by DuPont under the trademark "Lucite." The device is pocket-card in form slightly larger than a typical credit card for carrying in the pocket of the golfer. The card includes a darkened or non-reflective opaque surface 12 and a transparent opening 14 for viewing purposes. The transparent opening includes a bottom horizontal line 16 which has linear graduations imprinted upon the opaque surface and numbers which are relative to distances from golfer to flag stick. The distance number may be imprinted above or below the transparent window portion 14. Vertical guidelines 18 are imprinted over the transparent window portion 14. The line 18 are imprinted in 10-yard intervals, as shown. The width of the transparent opening at a given distance from ball to flag stick is determined by the formula:

$$F_1 = \frac{F_2 D_1}{D_2}$$

where
$F_2$=the height of a golf green flag stick (usually 7.5 feet);
$D_1$=distance from golfer's eye to the measuring device (usually arm's length); and
$D_2$=distance from the golfer's eye to the flag stick.

When this width is determined for various distances $D_2$ a curvilinear line 20 results at the top of the window. Linearly above the curvilinear line 20 are a plurality of removable pressure sensitive adhesive backed discs 22 which can be removable and replaceable adjacent the window 14 and upon which are imprinted numerals indicating the standard golf club numbers, usually the iron club numbers. As shown in FIGURE 2 an adhesive backed plastic strip 22' containing golf club numbers uniformly spaced to conform with the normal 10-yard distance variation between iron club numbers. The golfer positions this club number strip on the scale in accordance with his distance ability obtained with a given iron, preferably the number 5 iron. The transparent window 14 terminates with vertical end lines 24 and 26 which provide a means for calibrating the distance measuring and club selecting device 10 in that event the flag stick is taller or shorter than the prescribed 7.5 feet. The distance between lines 24 and 26 is determined by the aforesaid formula where $D_2$=20 yards.

In operation the card 10 is held at a fixed distance from the eye, usually about 20 to 25 inches, and by visually aligning the flag stick parallel with the vertical lines 18 such that it fits the distance between the top curvilinear line 20 and the bottom line 16 of the window, the golfer may then read directly the proper golf club number and the distance to the green so indicated. For example, a flag stick 30 is superimposed upon the transparent window and in this instance is aligned at approximately 130 yards indicating for the average golfer to utilize a number 7 iron club. As shown in FIGURE 2 utilizing the club number strip 22', a number 6 iron would be appropriate for a golfer who obtains 130 yards distance.

Although the device ordinarily has been calibrated to a standard 7.5 foot flag stick, it is understood that in some instances on some golf courses the flag stick may be higher or lower than this normal standard. In that event the device of this invention may be calibrated by establishing the distance from the eye to the card for future readings. To do so, the card is positioned vertically while the golfer is standing approximately twenty yards from the flag stick. The golfer will move the card away from or towards his eye until a point is reached where a flag stick will extend between lines 24 and 26. This distance from eye to card 10 can be marked or remembered by the golfer in any suitable manner. One manner of doing this may be by marking from one end of a golf club to a point on the shaft. In other instances a length of string 32 can be attached to a card indicating the proper distance from eye to card for a proper calibration, as shown in FIGURE 2.

In view of the fact that the discs 22 are removable it can be readily understood that the golfer may adjust the positions of the indicators for his particular ability. In some instances the numbers can be formed upon a single removable and replaceable strip and positioned, for example, along the straight edge of said opening 14, or the numbers 22 can be prearranged at a variety of fixed positions for golfers of various abilities. In other instances it is desirable that instead of removable disc 22, a part of the card 10 may include a relatively roughened surface which can be written upon with a pencil or other marking device and which can be readily changed in the event the golfer's abilities change.

It is to be understood that, although the description and claims are based upon the yard measurement, other well known distance measurement systems are inclusive and intended as equivalents. The invention has been described with reference to the specific and preferred embodiment. It will be apparent, however, that other modifications can be made without departing from the spirit and scope of the invention. For example, in some instances it may be desirable to provide a clip associated with the card 10 which can be readily attached to a marked spot upon a given club for proper alignment of the card relative to the eye of the golfer and hence provide properly calibrated distances and proper golf club selection. Accordingly, this invention should be construed not to be limited to the embodiment herein described but should be limited only by the scope of the appended claims.

What is claimed is:

1. A device for use by golfers to determine the distance from a golf green flag stick, comprising:
   a flat opaque card-like member for holding in the hand having a transparent window therein to view said golf green flag stick therethrough, the window being defined by:
   (a) a bottom horizontal straight line,
   (b) a top curvilinear line,
   (c) a plurality of parallel, equally spaced, vertical lines marked to indicate distances representative of the vertical distance between said bottom and top line according to the formula $$F_1 = \frac{F_2 D_1}{D_2}$$

where:
   $F_1$ denotes the distance from said bottom to said top line,
   $F_2$ denotes the height of a golf green flag stick,
   $D_1$ denotes the distance from the golfer's eye to the member, and
   $D_2$ denotes the distance from the golfer's eye to the golf green flag stick, and
   (d) opposed parallel vertical calibrating lines terminating said bottom and top line, the distance between said calibrating lines being correlated with the vertical distance calibration between said bottom and top lines such that, with the golfer spaced a preselected distance from a golf green flag stick, the distance $D_1$ the member must be held from the user's eye to accurately indicate the distance from the user's eye to any other golf green flag stick of equal height is determined.

2. A device according to claim 1 including changeable golf club number indicators positioned adjacent one of said bottom or top lines.

3. A device according to claim 2 wherein said golf club number indicators are removable and replaceable.

4. A device according to claim 1, wherein said changeable golf club number indicators comprise a single removable and replaceable strip having said golf club numbers equally spaced to conform with said uniform distance scale graduation.

5. A device according to claim 2, wherein said changeable golf club indicators comprise a surface adjacent said window to accept eraseable markings.

6. A device according to claim 1 wherein a string is attached thereto of length equal to $D_1$ for a given flag stick height.

References Cited

UNITED STATES PATENTS

| 745,257 | 11/1903 | Steadman | 33—64 |
| 1,363,670 | 12/1920 | Parker et al. | 33—64 |
| 1,455,347 | 5/1923 | Merritt | 33—64 |
| 2,090,658 | 8/1937 | Zak | 33—64 |
| 2,519,727 | 8/1950 | Yezdan | 33—64 |

FOREIGN PATENTS 205,650  10/1923  Great Britain.

ROBERT S. WARD, JR., *Primary Examiner.*

S. A. WAL, *Assistant Examiner.*